United States Patent
Bunderson et al.

(10) Patent No.: US 11,390,571 B2
(45) Date of Patent: Jul. 19, 2022

(54) PAMAM DENDRIMERS FOR FERTILIZER DELIVERY

(71) Applicant: Aqua Yield Operations LLC, Draper, UT (US)

(72) Inventors: Landon D. Bunderson, Springville, UT (US); Britney Leigh Hunter, Salt Lake City, UT (US); Kyle Jeffrey Isaacson, Salt Lake City, UT (US)

(73) Assignee: Aqua Yield Operations LLC, Draper, UT (US)

( * ) Notice: Subject to any disclaimer, the term of this patent is extended or adjusted under 35 U.S.C. 154(b) by 219 days.

(21) Appl. No.: 16/734,021

(22) Filed: Jan. 3, 2020

(65) Prior Publication Data

US 2020/0216367 A1    Jul. 9, 2020

Related U.S. Application Data

(60) Provisional application No. 62/787,793, filed on Jan. 3, 2019.

(51) Int. Cl.
*C05G 3/00* (2020.01)
*C05G 5/20* (2020.01)
*C05G 5/23* (2020.01)

(52) U.S. Cl.
CPC .............. *C05G 3/00* (2013.01); *C05G 5/20* (2020.02); *C05G 5/23* (2020.02)

(58) Field of Classification Search
None
See application file for complete search history.

(56) References Cited

U.S. PATENT DOCUMENTS

| | | | |
|---|---|---|---|
| 5,527,524 A | 6/1996 | Tomalia et al. | |
| 9,883,670 B2 | 2/2018 | Niedermeyer | |
| 2006/0154069 A1 | 7/2006 | Lin et al. | |
| 2010/0029477 A1 | 2/2010 | McLaughlin et al. | |
| 2013/0133386 A1 | 5/2013 | Baker et al. | |
| 2015/0342189 A1 | 12/2015 | Ding et al. | |
| 2015/0366186 A1 | 12/2015 | Li et al. | |
| 2017/0190632 A1* | 7/2017 | Krawczyk | A23K 40/10 |
| 2018/0169009 A1 | 6/2018 | Johnson et al. | |
| 2018/0370865 A1* | 12/2018 | Potthoff | A23K 40/10 |

FOREIGN PATENT DOCUMENTS

| | | |
|---|---|---|
| BG | 64816 | 5/2006 |
| CN | 110663506 | 1/2020 |
| EP | 2940080 | 2/2010 |
| WO | WO2019038642 | 2/2019 |

OTHER PUBLICATIONS

International Search Report and Written Opinion for PCT/US2020/012210; dated Mar. 24, 2020, 8 pages.
International Search Report and Written Opinion for PCT/US2020/027727; dated Jun. 18, 2020, 14 pages.
PUBCHEM. PAMAM dendrimer, ethylenediamine core, generation 0.0 solution; Sep. 13, 2005; pp. 1-16[online], retrieved on May 27, 2020; retrieved from https://pubchem.ncbi.nlm.nih.gov/compound/4140276.

* cited by examiner

*Primary Examiner* — Wayne A Langel
(74) *Attorney, Agent, or Firm* — Ray Quinney & Nebeker; John O. Carpenter

(57) ABSTRACT

An agricultural formulation for conveying nutrients to a plant includes Poly(aminoamide) (PAMAM) dendrimers and a fertilizer active ingredient.

18 Claims, 4 Drawing Sheets

PAMAM DENDRIMERS FOR FERTILIZER DELIVERY

CROSS-REFERENCE TO RELATED APPLICATIONS

This application claims priority to and the benefit of U.S. Provisional Patent Application No. 62/787,793, filed on Jan. 3, 2019, which is hereby incorporated by reference in its entirety.

BACKGROUND OF THE DISCLOSURE

Agricultural fertilizers or other agents are delivered to plants in a variety of methods. The fertilizer is delivered either to the root structure of the plant or through the leaves of the plant where the fertilizer is taken up through pores in the leaves—including cuticular cracks/pores. Additionally, the fertilizer is applied to the soil or leaves in a dry form or mixed in a fluid medium to suspend the fertilizer and mobilize the fertilizer.

Conventionally, the fluid application of the fertilizer or other agent can allow for more even and controlled application, as well as more rapid uptake of the fertilizer or other agent. Foliar application (application of a fertilizer to the leaves of the plant) can provide a more direct application of the fertilizer to the plant.

SUMMARY

In some embodiments, an agricultural formulation for conveying nutrients to a plant includes Poly(aminoamide) (PAMAM) dendrimers and a fertilizer active ingredient.

In some embodiments, an agricultural fertilizer formulation includes a liquid medium, a fertilizer active ingredient, and PAMAM dendrimers. The liquid medium and fertilizer active ingredient define a total volume. A volume ratio of the PAMAM dendrimers to the total volume of the liquid medium and fertilizer active ingredient is at least 1 parts per billion.

In some embodiments, a method of administering a fertilizer to a plant includes providing a fluid fertilizer mixture including fertilizer and a liquid medium having a volume ratio between 1:160 and 1:32,000, adding PAMAM dendrimer to the fluid fertilizer mixture to create a formulation where the dendrimer mass to fertilizer volume ratio is between 3 parts per million and 10 parts per million, and applying the formulation to the plant.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
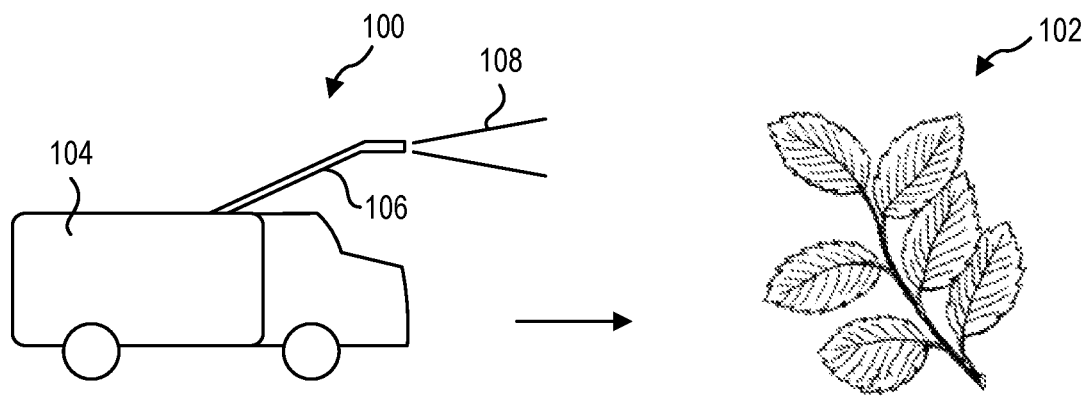
FIG. 1 is a schematic representation of foliar application of a fertilizer formulation from a spray truck to the leaves of a plant, according to at least one embodiment of the present disclosure.
Figure 2:
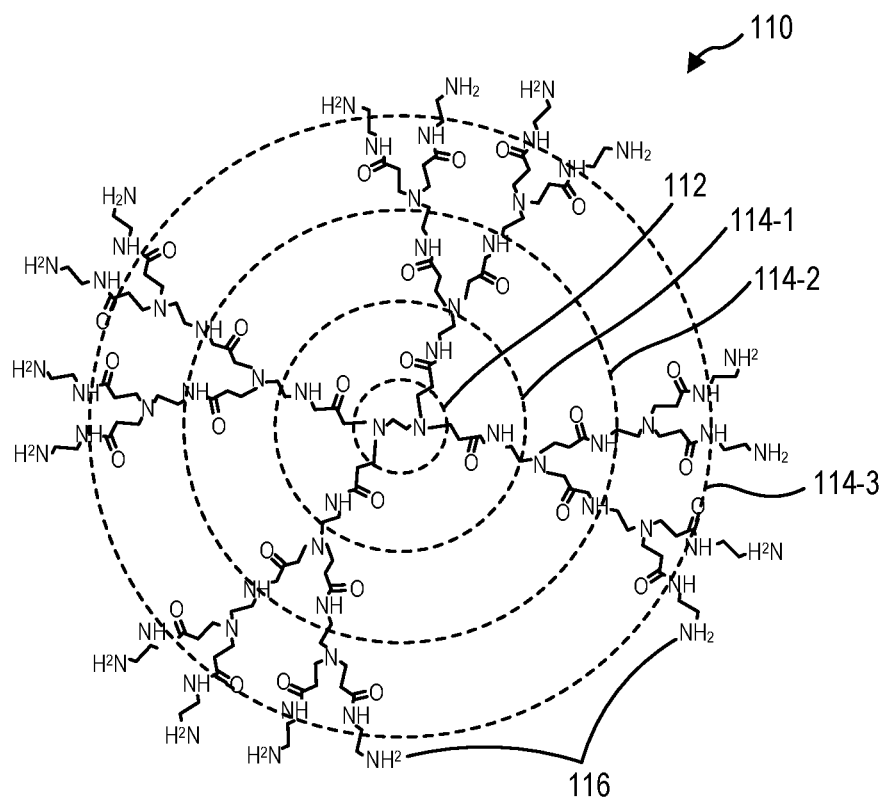
FIG. 2 is an illustration of the chemical structure of a PAMAM dendrimer, according to at least one embodiment of the present disclosure.

This disclosure generally relates to devices, systems, and methods for increasing the uptake of fertilizer in a plant. More particularly, the present disclosure relates to systems, mixtures, and methods for increasing the efficiency of foliar application of a fertilizer to a plant. In at least one embodiment of the present disclosure, a mixture of fertilizer and Poly(aminoamide) (PAMAM) dendrimers is applied to the leaves of a plant. In comparison to a conventional fertilizer mixture, a greater proportion of applied fertilizer is taken up by the leaves of a plant when the mixture includes PAMAM dendrimers with the fertilizer in a fluid medium.

Foliar feeding is the direct application of a mixture including a fertilizer or other agricultural agent directly to the leaves of a plant. Plants are able to absorb at least portions of the mixture through the stomata and the epidermis of the leaves. In some cases, the transport to nutrients may be faster through the stomata, but the overall absorption through the epidermis may result in a greater volume of nutrients absorbed. The different transport rates of the different parts of the leaf may result in a broader absorption curve of the nutrients as an initial dosage is received through the stomata and longer duration absorption occurs through the epidermis.

Foliar fertilization has been shown to produce a faster response than soil-based fertilization, as the fertilizer is absorbed directly into the leaves. Additionally, soil-based application can result in a leaching-out of the soil. For example, phosphorus applied to the soil can become fixed in a form that is inaccessible to the plant, thereby limiting the overall proportion of the nutrient taken up by the plant. In contrast, the fertilizers and other agents (collectively agrochemicals) applied to the leaves of a plant will not interact with other materials or other organisms in the soil.

However, there is a chance that the agrochemicals applied to the leaves are not absorbed. In some cases, the agrochemicals are shed from the leaves. In other cases, the agrochemicals simply dry on the leaves and are not absorbed. Availability of the fertilizer or other agents can include tailoring of the mixture to the plant, the environment, and the delivery mechanism. For example, proper adjustment of the mixture and the system can improve biological efficacy with a lower application rate and/or amount, as well as a lower impact on the environment and lower cost. Some factors in determining the mixture and application systems include even distribution of the agrochemical over the surface of the plant, safety of the mixture and application for workers and equipment, ease of preparation, performance, and environmental effect.

For example, the agrochemicals are applied to the plant in a liquid medium. The preferred liquid medium is water for many agrochemicals. Water may be desirable as a fluid medium for the agrochemicals because water has limited environmental effects and limited safety concerns relative to other options. Additionally, many crop plants require supplemental watering, and application of agrochemicals during watering can save time, resources, and money.

Various agrochemical formulations can be used for different purposes and applications. Formulations include an active ingredient and other ingredients such as surfactants, carriers, excipients, or other functional ingredients. For example, the present application will primarily refer to the use of fertilizer with PAMAM dendrimers as a carrier, however, additional ingredients may be used. For example, a fertilizer mixed with PAMAM dendrimers in water may have a greater transport rate than the same fertilizer mixed in water. However, a foliar application of either combination may not sufficiently adhere to the leaves of a plant to provide enough time for the leaves to absorb the active ingredient. In such examples, an additional ingredient may increase the surface tension of the fluid. In other examples, a surfactant may be included to decrease the surface tension.

In some embodiments, PAMAM dendrimers have an amine terminal group. The amine group has additional nitrogen atoms that are covalently bonded. As most plants are able to sever the nitrogen-bonds in the amine group, the PAMAM dendrimers are able to additionally deliver usable nitrogen to the plants, in addition to the active ingredients mobilized by the dendrimers in the formulation. The nitrogen in other layers of the dendrimer is also accessible to the plant as the dendrimer layers break down.

Environmental volatility may be improved by the nitrogen delivery through larger particles. For example, conventional nitrogen supplements including ammonia, nitrates, or other nitrogen-rich compounds can volatilize during delivery, resulting in a loss of the supplement before or after reaching the plant. Additionally, in some instances, the volatilized nitrogen compounds can be hazardous. For example, nitrates can react energetically in exposure to heat, creating a risk of fire or explosion. The amine terminal groups of a PAMAM dendrimer allow for the delivery of nitrogen to a plant with a lessened risk of volatility.

FIG. 1 is a schematic representation of foliar fertilization. A delivery system 100 is used to apply a fluid to the leaves 102 of the plant. In some embodiments, the delivery system 100 is a mobile system, such as a backpack, truck, tractor, trailer, sprayer (boom or row-crop sprayer), or other agricultural machinery that may be loaded with a holding tank 104 and driven to the delivery location. In other embodiments, the delivery system 100 is a stationary system. For example, the delivery system 100 can include a drip irrigation system, such as one using micro spray heads to atomize the formulation. In other examples, the delivery system 100 can include a sprinkler system or a center pivot irrigation system that sprays a liquid formulation onto the surface of the leaves 102.

In a particular example, the delivery system 100 includes a sprayer vehicle with a holding tank 104 and a boom 106. In such examples, the boom 106 is directed toward the leaves 102 of the plant and a spray 108 of the formulation is delivered to the leaves 102. In some cases, the formulation may be internally agitated in the holding tank 104 to limit and/or prevent aggregation of the agents in the formulation. In other cases, the formulation may experience external agitation of the movement of the holding tank 104 only, with no further internal agitation. In yet other examples, such as a stationary delivery system, the holding tank may be substantially still with no internal or external agitation.

Nanoparticles, as described herein, are particles having a particle diameter between 1 and 1000 nanometers (nm). Nanoparticles tend to have strong surface interactions and aggregate with one another and other particles. Dendrimers, in particular, have a strong tendency to aggregate.

Applications of dendrimers conventionally involve conjugating other chemicals to the dendrimer surface that can function as detecting agents (such as a dye molecule), affinity ligands, targeting components, radioligands, imaging agents, or pharmaceutically active compounds. Dendrimers have very strong potential for these applications because their structure can lead to multivalent systems. For example, one dendrimer molecule can have hundreds of possible sites to couple to an active ingredient or chemical agent, depending on the number of generations of branching layers in the dendrimer.

Dendrimers are conventionally used for drug delivery applications due to their monodispersity, water solubility, encapsulation ability, and large number of active terminal groups. FIG. 2 is a structural diagram of an example PAMAM dendrimer 110. The PAMAM dendrimer 110 has a core 112. In some examples, the core 112 is a diamine, such as ethylenediamine, that is the basis from which branching layers 114-1, 114-2, 114-3 or shells or generations are attached. For example, a third generation (3G) dendrimer has three branching layers 114-1, 114-2, 114-3. While the branching layers 114-1, 114-2, 114-3 of the embodiment illustrated in FIG. 2 repeat, the branching layers 114-1, 114-2, 114-3 are synthesized sequentially, allowing for different structures in the individual branching layers 114-1, 114-2, 114-3 if desired.

The branching layers 114-1, 114-2, 114-3 introduce additional terminal sites at each layer, increasing the ultimate number of terminal groups 116 possible with each successive layer. For example, the core 112 has four terminal sites, to which the first branching layer 114-1 is connected. The first branching layer 114-1 then doubles the number of terminal sites. The second branching layer 114-2 and third branching layer 114-3 each double the number, as well. In other embodiments, the branching layers 114-1, 114-2, 114-3 have other multiplicities that change the number of active terminal sites to which the successive generation bonds. For example, each of the branching layers 114-1, 114-2, 114-3 of the embodiment illustrated in FIG. 2 has a multiplicity of 2, resulting in 16 terminal groups 116 in the third branching layer. In another example with the same core 112 where each of the branching layers 114-1, 114-2, 114-3 has a multiplicity of three, the third generation would allow for 48 terminal groups 116.

In some embodiments, the PAMAM dendrimers used to deliver fertilizer and provide supplemental nitrogen are at least second-generation (2G) dendrimers. In other embodiments, the PAMAM dendrimers used to deliver fertilizer and provide supplemental nitrogen are at least 2.5G dendrimers. In yet other embodiments, the PAMAM dendrimers used to deliver fertilizer and provide supplemental nitrogen are at least 3G dendrimers. In further embodiments, the PAMAM dendrimers used to deliver fertilizer and provide supplemental nitrogen are at least 3.5G dendrimers.

Fertilizers carry an industry shorthand for the three most common nutrients provided to the plant. The format for the shorthand is generally N—P—K, where the letters are the atomic symbol for the nutrient. For example, a general-purpose fertilizer with a 10-10-10 designation contains 10% by weight of each of a nitrogen-supplying compound, a phosphorus-supplying compound, and a potassium-supplying compound. The remaining composition of the fertilizer is inert ingredients in the formulation. The nutrient-supplying compounds can have net negative or positive charges.

During testing, PAMAM dendrimers have shown the ability to mechanically interact with fertilizers to increase the transport of the fertilizer molecule, despite the terminal groups and the fertilizer molecules both being negatively charged. For example, a fertilizer mixture of 12-0-0 Urea with 6% Iron and 3% Manganese concentrations has a net negative charge. While the charge may aid in solubility of the fertilizer mixture, the charge would be expected to inhibit interaction with the PAMAM dendrimers. However, in testing, the PAMAM dendrimers have been shown to increase the mobility of the fertilizer mixture in foliar application.

Figure 3:
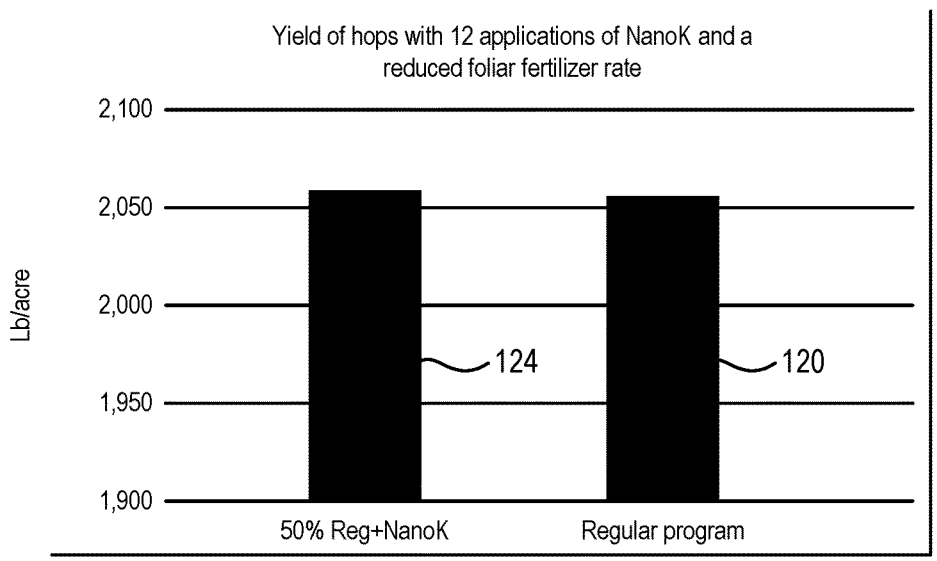
FIG. 3 is a graph illustrating the performance of foliar fertilization in hops using PAMAM dendrimers, according to at least one embodiment of the present disclosure.

Table 1 includes the results of a test conducted with foliar application of fertilizer formulations on Bermudagrass. Different formulations were applied to seven plots. The response to applied fertilizer formulations was measured in an average greenness rating of the individual plots. All treatments were applied at a rate of 0.1 lb of Nitrogen per 1000 square feet. A tenth of a pound of Nitrogen from this product is 32 ml of fertilizer solution. All treatments were sprayed in a tank with 3.8 L of water. Treatment 1 is a blend of 12-0-0 Urea with 6% Iron and 3% Manganese fertilizer with hollow mesoporous silica nanoparticles having a 120 nm diameter. The hollow mesoporous silica nanoparticles were provided in a concentration of 0.034 mg/ml of fertilizer solution. Treatment 2 is a blend of the fertilizer with hollow iron oxide nanoparticles having a 7 nm diameter. The hollow iron oxide nanoparticles were provided in a concentration of 0.02 mg/ml of fertilizer solution. Treatment 3 is a blend of the fertilizer with G3.5 PAMAM dendrimers at a dendrimer mass to fertilizer volume ratio of 3 parts per million (ppm) concentration. Treatment 4 is a blend of the fertilizer with G3.5 PAMAM dendrimers at a 6 ppm concentration. Treatment 5 is a blend of the fertilizer with a first mixture of spherical nanoparticles having a varied diameter. The nanoparticles were provided in a concentration of 0.007 mg/ml of fertilizer solution. Treatment 6 is a blend of the fertilizer with a second mixture of spherical nanoparticles having a varied diameter. The nanoparticles were provided in a concentration of 0.01 mg/ml of fertilizer solution. Treatment 7 is the control with only the liquid fertilizer solution.

| Treat. | Rep A | Rep B | Avg. | Rep A | Rep B | Avg | Rep A | Rep B | Avg |
|---|---|---|---|---|---|---|---|---|---|
| 1 | 6 | 8 | 7.0 | 6 | 8 | 7.0 | 6 | 7.5 | 6.75 |
| 2 | 7 | 7 | 7.0 | 7 | 7 | 7.0 | 7 | 6 | 6.5 |
| 3 | 7 | 5 | 6.0 | 7 | 5 | 6.0 | 6 | 5 | 5.5 |
| 4 | 8 | 8 | 8.0 | 8 | 8 | 8.0 | 7 | 7.5 | 7.25 |
| 5 | 7 | 7 | 7.0 | 8 | 8 | 8.0 | 8 | 8 | 8.0 |
| 6 | 5 | 8 | 6.5 | 5 | 8 | 6.5 | 5 | 8 | 6.5 |
| 7 | 6 | 7 | 6.S | 6 | 7 | 6.5 | 6 | 6.5 | 6.25 |

Each treatment was applied to two plots (Rep A and Rep B) and measured at three times. The sets of measurements were collected after three days, after 5 days, and after 9 days, respectively. The experiment illustrated that PAMAM dendrimer concentrations above 3 ppm show improved uptake of fertilizer. For example, treatment 4 including the G3.5 PAMAM dendrimers at a 6 ppm concentration represented the fastest absorption and response to the application of the fertilizer with the highest greenness on day 3 and day 5, while the first mixture of spherical nanoparticles (Treatment 5) showed similar improvements in uptake, but did so more slowly. Both the spherical and dendrimer nanoparticles showed an increase in average greenness. The 6 ppm concentration PAMAM dendrimers showed the greatest increase and the fastest increase in greenness.

Further tests were conducted on hops, wheat, millet, and watermelons to test both the additional mobility of fertilizers used in conjunction with the dendrimer agent, as well as test the availability of the nitrogen in the PAMAM dendrimers to the plants. Application of the PAMAM dendrimer agent without fertilizer allows the evaluation of the plant's ability to access the nitrogen in the terminal amine groups independently of any growth or greenness improvements due to a separate fertilizer. While the PAMAM dendrimers described herein show an improvement in crop growth independently, for clarity, the fertilizer is referred to as the active ingredient and the PAMAM dendrimers will be continued to be referred to as a mobilization aid in the formulation.

The concentration of the dendrimers in the formulation relative to the concentration of the active ingredient and the relative to the overall volume of fluid into which the dendrimers are added affects the performance. While the dendrimers are able to interact with the active ingredients, the dendrimers also exhibit interaction with the other dendrimers. Therefore, increasing a dendrimer concentration in a constant volume of fluid reduces the performance of the formulation, as the dendrimers aggregate.

FIG. 3 through FIG. 5 illustrate tests demonstrating the additional fertilization provided by the PAMAM dendrimers of the present description. The PAMAM dendrimers are able to increase the transport rate of the applied fertilizer and reduce the amount of fertilizer necessary to produce equivalent or improved yields in both large-scale and small-scale tests.

FIG. 3 is an example of the foliar application of two formulations of fertilizer with PAMAM dendrimers in comparison to a conventional application of fertilizer. The regular program in the right bar 120 of the graph 118 is a control application of fertilizer. The bar 124 on the left is a fertilizer formulation including a nanoprepared potash and delivered in a foliar application. As used herein, "nanoprepared" should be understood to mean prepared or produces such that an average particle size of the produce is less than 1 micron. For example, the potash in the "NanoK" product is a potassium supplement (0-0-21) of $K_2O$ particles with an average particle size of less than 1 micron. The left bar 124 of the graph illustrates a reduction in the regular fertilizer in the formulation of 50% with an introduction of PAMAM dendrimers to the formulation. As shown in the graph 118, the formulation of the left bar 124 outperformed the regular program of the right bar 120 using half of the fertilizer when PAMAM dendrimers are included in the formulation.

The regular program includes a foliar application of a conventional fertilizer for hops. The left bar 124 of the graph 118 reflects a more efficient transport of the fertilizer and the potassium supplement to the plant through the leaves. Additionally, the PAMAM dendrimers of the formulation reflected by the left bar 124 provide nitrogen to the plant. The formulation, therefore, provides a more efficient transport of the fertilizer, while also providing a potassium and nitrogen supplement.

Figure 4:
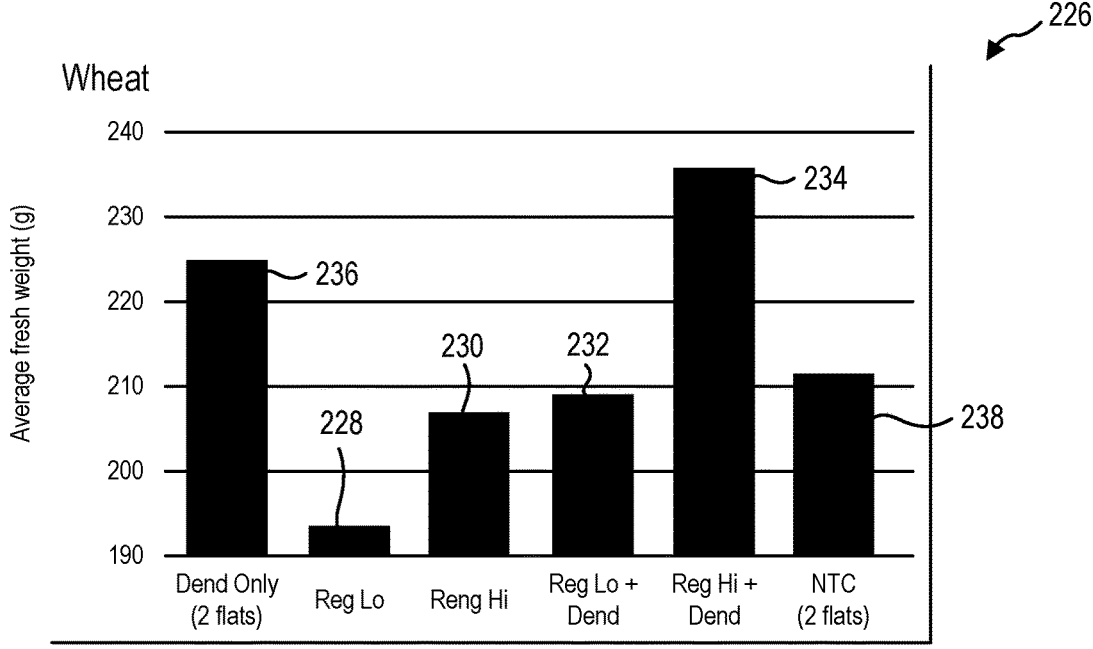
FIG. 4 is a graph illustrating yields of wheat using different fertilization methods, according to at least one embodiment of the present disclosure.

FIG. 4 is a chart 226 illustrating the difference in yield from a greenhouse trial of wheat. The regular fertilizer application, both in low concentration illustrated in the second bar 228 and in high concentration illustrated in the third bar 230, inhibited growth. This may have been due to the fertilizer concentration being too high in salt and retarding growth. The inclusion of dendrimers in the formulation with the low and high concentrations of the fertilizer is illustrated in the fourth bar 232 and fifth bar 234, respectively. For each of the low concentration and the high concentration, the amount of fertilizer in the application remained the same. For example, the increase between the second bar 228 and fourth bar 232 reflects a change in the low concentration formulation of only the addition of PAMAM dendrimers. Similarly, the increase between the third bar 230 and fifth bar 234 reflects a change in the high concentration formulation of only the addition of PAMAM dendrimers.

Finally, the foliar application of only PAMAM dendrimers is reflected in the first bar 236 of the chart 226. The application of only PAMAM dendrimers resulted in a net increase above the no-treatment control (NTC) bar 238. The wheat is able to take up the available nitrogen from the PAMAM dendrimers, allowing the PAMAM dendrimers to act as both the transport enhancer and a nitrogen supplement. Testing of the nitrogen uptake of the available nitrogen in the PAMAM dendrimers is described more in relation to FIG. 6 and FIG. 7.

Figure 5:
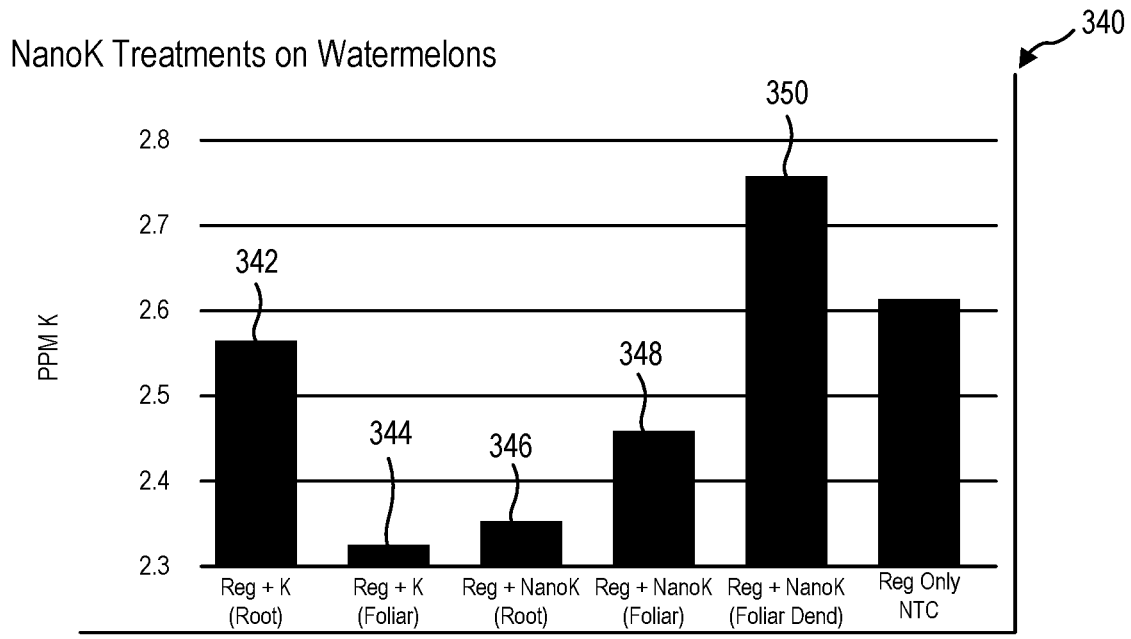
FIG. 5 is a graph illustrating potassium concentrations in watermelons using different fertilization methods, according to at least one embodiment of the present disclosure.

FIG. 5 is a graph 340 that illustrates the application of different fertilizer formulations on watermelon crop plants. The graph 340 illustrates a comparison of both root and foliar feeding, as well as dendrimer and non-dendrimer formulations. The graph shows the potassium concentration found in the watermelons produced through the feeding. The first bar 342 reflects the potassium concentration with a regular fertilizer with a conventional potassium supplement at 63 parts per million delivered through a root saturation feeding. The second bar 344 reflects a reduction in the potassium concentration when the same regular formulation with a conventional potassium supplement at 63 parts per million is delivered in a foliar application. Note the offset of the y-axis scale. The foliar application yielded approximately an 8.5% reduction relative to the root application of the regular fertilizer and conventional potassium supplement.

The third bar 346 and fourth bar 348 show the effect of nanoprepared potassium supplement at 63 parts per million with the regular fertilizer in the root application and the foliar application. The nanoprepared potassium was more readily taken up in the foliar application than a conventional potassium supplement in the foliar application (shown in the second bar 344). However, in both the root and foliar application, the formulation with nanoprepared potassium yielded a lower potassium concentration in the watermelons.

In contrast, the inclusion of PAMAM dendrimers with the nanoprepared potassium supplement in a foliar application in the fifth bar 350 shows an increase of approximately 7% over the root application of the regular fertilizer and conventional potassium supplement. The inclusion of the PAMAM dendrimers shows an increase of approximately a 12.6% increase relative to the same foliar application of the same formulation without the PAMAM dendrimers. The PAMAM dendrimers included in the formulation increase the transport of the potassium in the foliar application.

Figure 6:
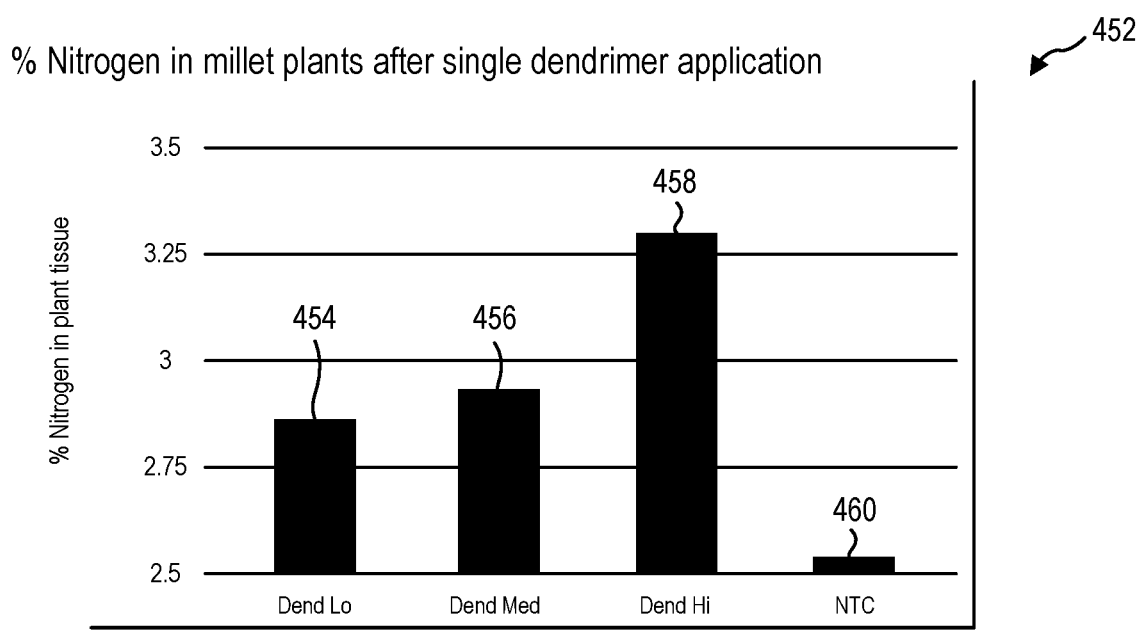
FIG. 6 is a graph illustrating nitrogen concentrations in millet after only PAMAM dendrimer applications, according to at least one embodiment of the present disclosure.
Figure 7:
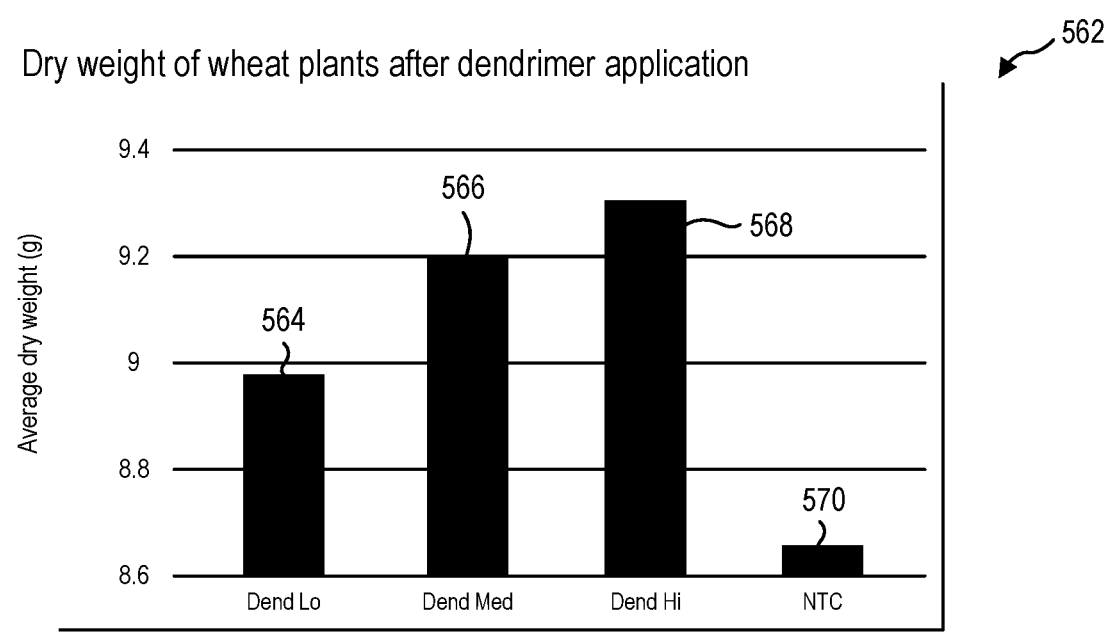
FIG. 7 is a graph illustrating yield increases in wheat after only PAMAM dendrimer applications, according to at least one embodiment of the present disclosure.

FIG. 6 and FIG. 7 illustrate the additional benefit of the PAMAM dendrimers providing nitrogen and acting as a nitrogen supplement independently of the formulation in which the dendrimers are included. FIG. 6 is a graph 452 showing the nitrogen concentration within millet plant tissue after a single application of dendrimers.

The first bar 454, second bar 456, and third bar 458 reflect different concentration levels of the applied dendrimers. The first bar 454 is a 1 part per billion (ppb) concentration of the dendrimers in the total volume of the as-applied spray. The second bar 456 is a 2-ppb concentration of the dendrimers in the total volume of the as-applied spray. The third bar 458 is a 3-ppb concentration of the dendrimers in the total volume of the as-applied spray. The fourth bar 460 depicts the control plants that did not receive a PAMAM dendrimer application. The first bar 454 reflects a low concentration of dendrimers applied to the millet and shows an approximate increase in nitrogen concentration in the plant tissue of 10% over the control. The second bar 456 reflects a medium concentration of dendrimers applied to the millet and shows an approximate increase in nitrogen concentration in the plant tissue of 5% relative to the low concentration.

The third bar 458 represents the nitrogen concentration in the plant tissue after a single application of a high concentration of the PAMAM dendrimers. A single foliar application of a high concentration of PAMAM dendrimers yielded an approximate increase of 30% over the control. The high concentration yielded an approximate increase of 14% in nitrogen in the plant tissue over the medium concentration.

FIG. 7 is a graph 562 that illustrates growth increase in the dry weight of wheat after a single dendrimer application versus a control. The first bar 564, second bar 566, and third bar 568 show the dry weight of the wheat with a PAMAM dendrimer application, while the fourth bar 570 reflects a control plot of wheat without PAMAM dendrimer application.

The first bar 564 shows the dry weight of the wheat after a low concentration application of the PAMAM dendrimers. The low concentration yielded approximately a 3.7% increase in the dry weight over the control. The second bar 566 shows the dry weight of the wheat after a medium concentration of the PAMAM dendrimers, and it reflects an approximate 6.4% increase over the control dry weight. The third bar 568 shows the dry weight of the wheat after a medium concentration of the PAMAM dendrimers, and it reflects an approximate 7.8% increase over the control dry weight.

FIG. 6 and FIG. 7 reflect the ability of the PAMAM dendrimers alone to provide nitrogen to the plant (increasing the nitrogen concentration as shown in FIG. 6) and to improve the growth rate of the plant (increasing the dry weight as shown in FIG. 7). Dendrimers are conventionally used pharmaceutical applications to increase drug delivery. The use of PAMAM dendrimers in a fertilizer formulation unexpectedly provides an additional nitrogen supplement to the plants, increasing both the nitrogen concentration and the growth rate. In some embodiments, the nitrogen provided by the PAMAM dendrimers may further increase the effectiveness of the other active ingredient(s) in the fertilizer formulation, as well.

A fertilizer formulation including PAMAM dendrimers has been found to benefit from the inclusion of PAMAM dendrimers, but also may saturate above a particular concentration of the PAMAM dendrimers. The performance of the formulation is related the environment and the plants to which the formulation will be applied. In some embodiments, the mass to volume ratio of the dendrimers to the volume of fertilizer is in a range having an upper value, a lower value, or upper and lower values including any of 1 ppm, 2 ppm, 3 ppm, 4 ppm, 5 ppm, 6 ppm, 7 ppm, 8 ppm, 9 ppm, 10 ppm, or any values therebetween. For example, the mass to volume ratio may be greater than 1 ppm of dendrimers to fertilizer. In other examples, the mass to volume ratio may be less than 10 ppm. In yet other examples, the mass to volume ratio may be between 1 ppm and 10 ppm. In further examples, the mass to volume ratio may be between 3 ppm and 8 ppm. In at least one example, the mass to volume ratio may be about 6 ppm of PAMAM dendrimers to fertilizer. In a specific example, 37 mg of the PAMAM dendrimers is added to 4 ounces of a fertilizer and applied in an aqueous solution to an acre of plants.

In some cases, the ratio of dendrimers used in the formulation may be better characterized by the amount of dendrimers included in the total volume of the fertilizer formulation (including fertilizer and a liquid medium, such as water), as prepared. In some embodiments, the amount of dendrimers in the total volume of the formulation may be in a range having an upper value, a lower value, or upper and lower values including any of 1 part per billion (ppb), 2 ppb, 3 ppb, 4 ppb, 5 ppb, 6 ppb, 7 ppb, 8 ppb, 9 ppb, 10 ppb, or any values therebetween. For example, the amount of PAMAM dendrimers added to a fertilizer formulation may be greater than 1 ppb of the total volume of the formulation. In other examples, the amount of PAMAM dendrimers added to a fertilizer formulation may be less than 10 ppb of the total volume of the formulation. In yet other examples, the amount of PAMAM dendrimers added to a fertilizer formulation may be between 1 ppb and 10 ppb of the total volume of the formulation. In further examples, the amount of PAMAM dendrimers added to a fertilizer formulation may be between 3 ppb and 8 ppb of the total volume of the formulation. In at least one example, the amount of PAMAM dendrimers added to a fertilizer formulation may be about 6 ppb of the total volume of the formulation. In a particular example, a 15-gallon aqueous fertilizer formulation containing 100 milliliters of fertilizer may have 4 micrograms of PAMAM dendrimers added. In other examples, a formulation for one acre may have about 15 micrograms of PAMAM dendrimers added. In yet other examples, a formulation for one acre may have about 30 micrograms of PAMAM dendrimers added. In further examples, a formulation for one acre may have less than 37 micrograms of PAMAM dendrimers added.

In some examples, it may be crucial that the amount of PAMAM dendrimers added does not exceed 10 ppb of the total formulation. In some formulations, exceeding 10 ppb concentration of the dendrimers in the total volume of the formulation may increase aggregation of the dendrimers with one another, reducing total amount of available dendrimers to interact with the fertilizer and to increase the transport mobility of the fertilizer during application.

Some formulations of fertilizer and a liquid medium may have a volume ratio of 1:160, such as a fertilizer formulation containing 4 ounces of fertilizer and 5 gallons of water that is applied from a spray tank. Other formulations of fertilizer and a liquid medium may have a volume ratio of 1:32000; such as a fertilizer formulation containing 4 ounces of fertilizer and 1000 gallons of water that is applied through a general irrigation system. In some embodiments, a formulation may include a volume ratio of fertilizer to a liquid medium in a range having an upper value, a lower value, or upper and lower values including any of 1:160, 1:240, 1:400, 1:800, 1:1600, 1:3200, 1:6400, 1:16000, 1:32000, or any values therebetween. For example, fertilizer formulations including PAMAM dendrimers may have a volume ratio of the fertilizer to the liquid medium less than 1:160. In other examples, the fertilizer formulations including PAMAM dendrimers may have a volume ratio of the fertilizer to the liquid medium greater than 1:32000. In yet other examples, the fertilizer formulations including PAMAM dendrimers may have a volume ratio of the fertilizer to the liquid medium between 1:160 and 1:32000. In at least one example, the fertilizer formulations including PAMAM dendrimers may have a volume ratio of the fertilizer to the liquid medium of about 1:3200.

As described herein, the formulation may have different characteristics based on the needs of different plants. For example, the acidity of the formulation may change to tailor the formulation to the application. In some embodiments, the formulation containing PAMAM dendrimers has a pH less than 8.0 In other embodiments, the formulation containing PAMAM dendrimers has a pH less than 7.0 (i.e., more acidic than neutral). In yet other embodiments, the formulation has a pH less than 6.5. A formulation with a pH less than 6.5 may allow the PAMAM dendrimers to interact with the active fertilizer ingredient in the formulation more readily and to more efficiently increase the transport rate of the active ingredient.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A formulation for conveying nutrients to a plant, the formulation comprising:
    Poly(aminoamide) (PAMAM) dendrimers; and
    a fertilizer active ingredient in an aqueous solution, wherein a mass to volume ratio of the PAMAM dendrimers to a total volume of the fertilizer active ingredient in an aqueous solution is no more than 10 ppb.

2. The formulation of claim 1, the fertilizer active ingredient being negatively charged.

3. The formulation of claim 2, the dendrimers having a plurality of negatively charged reaction sites.

4. The formulation of claim 1, the formulation having a pH below 7.0.

5. The formulation of claim 1, the formulation having a pH below 6.5.

6. The formulation of claim 1, the fertilizer active ingredient and the liquid medium having a volume ratio between 1:160 and 1:32,000.

7. The formulation of claim 1, the PAMAM dendrimer having an amine terminal group.

8. The formulation of claim 1, the PAMAM dendrimer being at least a second-generation dendrimer.

9. The formulation of claim 1, the PAMAM dendrimer and fertilizer active ingredient having a mass to volume ratio of at least 3 parts per million (ppm).

10. An agricultural fertilizer formulation, the formulation comprising:
    a liquid medium;
    a fertilizer active ingredient, where the liquid medium and fertilizer active ingredient have a total volume; and
    PAMAM dendrimers, a mass to volume ratio of the PAMAM dendrimers to the total volume of the liquid medium and fertilizer active ingredient being at least 1 parts per billion (ppb) and no more than 10 ppb.

11. The formulation of claim 10, the PAMAM dendrimers being 2.5 generation dendrimers.

12. The formulation of claim 10, the PAMAM dendrimers and fertilizer active ingredient having a mass to volume ratio of no more than 10 ppm.

13. The formulation of claim 10, the fertilizer active ingredient providing no nitrogen supplement.

14. A method of administering a fertilizer to a plant:
    providing a fluid fertilizer mixture including fertilizer and a liquid medium having a volume ratio between 1:160 and 1:32,000;
    adding PAMAM dendrimer to the fluid fertilizer mixture to create a formulation where the dendrimer mass to fertilizer volume ratio is between 3 ppm and 10 ppm, and wherein a mass to volume ratio of the PAMAM dendrimers to the total volume of the fertilizer active ingredient in an aqueous solution is no more than 10 ppb; and
    applying the formulation to the plant.

15. The method of claim 14, applying the formulation to the plant including applying the formulation to a leaf of the plant.

16. The method of claim 14, applying the formulation to the plant including applying the formulation to a root of the plant.

17. The method of claim 14, further comprising applying at least 5.0 gallons per acre of the formulation.

18. The method of claim 14, further comprising applying no more than 37 micrograms of PAMAM dendrimers per acre.

* * * * *